Aug. 30, 1938.    R. FOSTER    2,128,240
DRILL
Filed Aug. 21, 1936    2 Sheets-Sheet 1
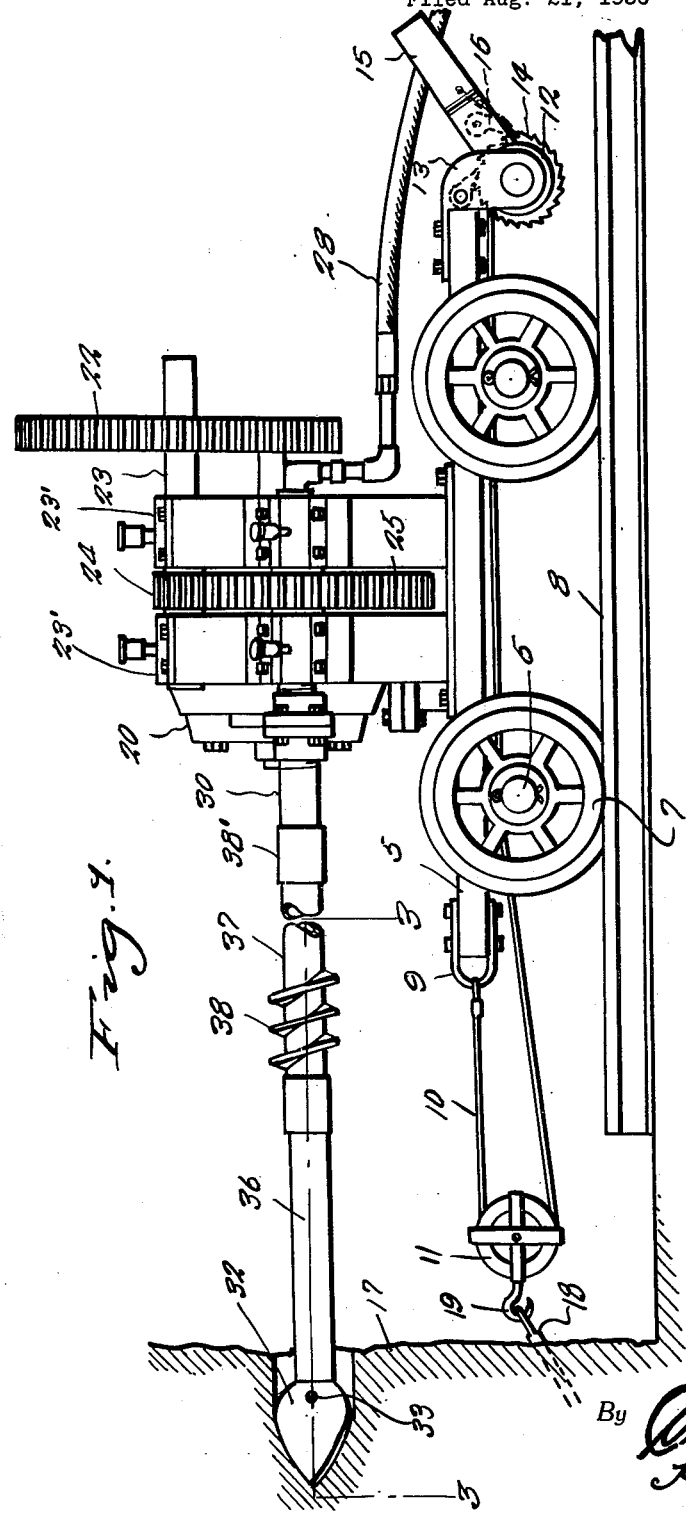
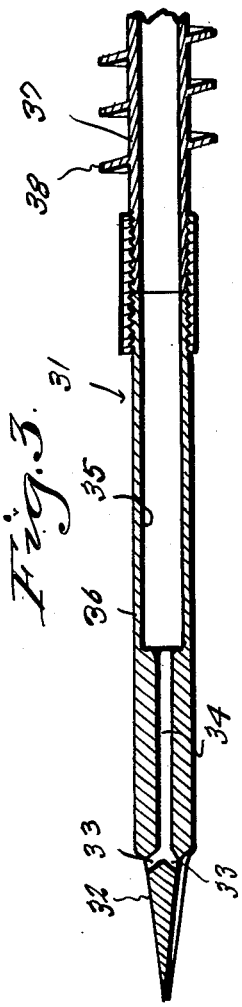
Inventor
Robert Foster
By Clarence A. O'Brien
Hyman Berman
Attorneys Aug. 30, 1938.  R. FOSTER  2,128,240.
DRILL
Filed Aug. 21, 1936   2 Sheets-Sheet 2
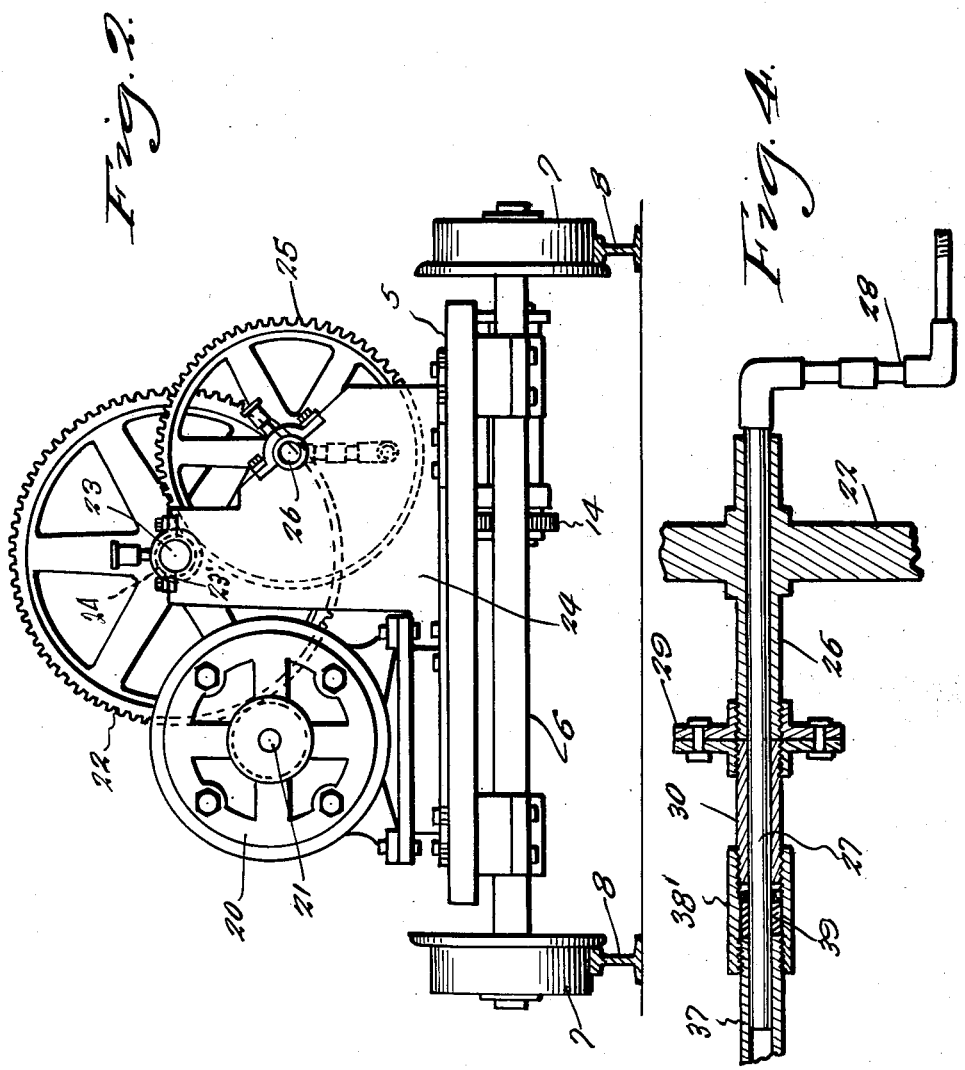
Inventor
Robert Foster
By Clarence A. O'Brien
Hyman Berman
Attorneys Patented Aug. 30, 1938

2,128,240

UNITED STATES PATENT OFFICE 2,128,240

DRILL

Robert Foster, Bradley, Ohio

Application August 21, 1936, Serial No. 97,266

2 Claims. (Cl. 255—20)

This invention appertains to new and useful improvements in drills, and more particularly to a drill of the horizontal operative type.

The principal object of the present invention is to provide a drill which will be effective in drilling horizontally in place of vertically and at slants which operation is adopted at present in various practices in mines.

Other very important objects and advantages of the invention will become apparent to the reader of the following specification.

In the drawings:

Figure 1 represents a side elevational view of the machine.

Fig. 2 represents an end elevational view of the machine.

Fig. 3 is a fragmentary longitudinal sectional view through the drill tool.

Fig. 4 is a fragmentary longitudinal sectional view through the tool drive and fluid conduit.

Referring to the drawings wherein like numerals designate like parts, it can be seen that numeral 5 represents a platform for the machine which is provided with the axles 6 on which are the flanged wheels 7 capable of riding on rails 8. To move the wheeled platform on the rails 8, a clevis 9 is provided on the forward end of the platform 5 and from this a cable 10 extends to pass over the pulley 11 and return thru guides under the platform 5 to the drum 12, supported by the brackets 13 on the rear end of the platform 5. The drum 12 is provided with the ratchet wheel 14 which can be operated by the pivotal lever 15 and pawl 16 thereon for winding the drum and drawing the platform toward the wall 17 to be bored. In this wall 17 is the anchor 18 having an eye with which the hook 19 on the pulley 11 is engaged.

Mounted on the platform 5 is the electric motor 20, the armature shaft 21 of which is provided with a pinion meshing with the large gear 22 on the shaft 23 supported on the bearing block 23'. The shaft 23 is provided with the pinion 24 meshing with the gear 25 on the shaft 26. This gear shaft 26 is hollow and has the conduit 27 extending therethrough.

A fluid pipe line 28 connects to one end of the conduit 27. A union 29 connects the forward end of the hollow shaft 26 to the pipe section 30.

Numeral 31 represents generally the drilling tool which is provided with the head portion 32 of a blade formation and through which opens the ducts 33 from the main duct 34 therein, which main duct opens into the fluid receiving chamber 35 of the shank portion 36 of the tool head.

The tool assembly may include a number of sections 37 and certain of these sections may be provided with screw threads 38 for guiding the drill bit 32. The section 37 which connects to the pipe sections 30 is provided with an internally threaded socket 38' for receiving the adjacent threaded end of the pipe section 30 and in this is a packing gland 39. (See Fig. 4.) Furthermore, it can be seen that the conduit 27 extends entirely through the shaft 26, pipe section 30 and into the tool section 37.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a drilling machine, a platform, axles supported from the underside of the platform, wheels carried by the axles, a trackway for the wheels, drilling means mounted upon the platform, a drum rotatably mounted under the rear end of the platform, a ratchet wheel carried by the drum, an oscillatory hand bar supported for rocking movement from the rear end of the platform and provided with a pawl for engagement with the said ratchet wheel, a cable having one end attached to the front end of the platform, a block over which the cable extends and anchoring means for the block adapted to be placed in advance of the platform, said cable extending rearwardly from the block and between the axles and the bottom of the platform and having its opposite end wound on the drum, and a dog normally engaging the ratchet wheel.

2. Drilling means of the class described comprising a track, a wheeled platform having its wheels engaging the track, manually operated means for moving the platform on the track, an upright frame on the platform, a horizontally arranged tubular shaft supported on the platform, means for rotating said shaft, a tubular shaft section, a union connecting the said shaft section with the tubular shaft, a hollow drill line, a coupling connecting the same with the tubular shaft section, a pipe extending through the tubular pipe, through the tubular section and into the drill line, packing means in the coupling and around the pipe, means for connecting the pipe with a liquid supply and power means on the platform for rotating the tubular shaft.

ROBERT FOSTER.